United States Patent [19]

Wu

[11] Patent Number: 4,666,468
[45] Date of Patent: May 19, 1987

[54] GAS SEPARATIONS USING MEMBRANES COMPRISING PERFLUORINATED POLYMERS WITH PENDANT IONOMERIC MOIETIES

[75] Inventor: Marinda L. Wu, San Ramon, Calif.

[73] Assignee: The Dow Chemical Company, Midland, Mich.

[21] Appl. No.: 843,474

[22] Filed: Mar. 24, 1986

[51] Int. Cl.$^4$ .............................................. B01D 53/22
[52] U.S. Cl. .............................................. 55/16; 55/68
[58] Field of Search ............................ 55/16, 68, 158; 428/442

[56] References Cited

U.S. PATENT DOCUMENTS

| | | | |
|---|---|---|---|
| 3,246,449 | 4/1966 | Stern et al. | 55/16 |
| 3,308,107 | 3/1967 | Selman et al. | 55/16 X |
| 3,735,558 | 5/1973 | Skarstrom et al. | 55/16 |
| 3,735,559 | 5/1973 | Salemme | 55/16 |
| 3,780,496 | 12/1978 | Ward et al. | 55/16 |
| 3,940,916 | 3/1976 | Grot | 55/158 X |
| 3,998,990 | 12/1976 | Iwami et al. | 428/442 |
| 4,035,291 | 7/1977 | Chiang et al. | 210/23 |
| 4,054,707 | 10/1977 | Quentin | 428/213 |
| 4,228,205 | 10/1980 | Hudecek et al. | 55/16 X |
| 4,318,714 | 3/1982 | Kimura et al. | 55/16 |
| 4,414,693 | 11/1983 | Brody | 55/16 X |
| 4,433,082 | 2/1984 | Grot | 524/755 |
| 4,515,761 | 5/1985 | Plotzker | 55/16 X |
| 4,521,224 | 6/1985 | Li | 55/16 |

FOREIGN PATENT DOCUMENTS

| | | |
|---|---|---|
| 1028255 | 3/1978 | Canada . |
| 122049 | 10/1984 | European Pat. Off. ............... 55/158 |
| 2907188 | 8/1979 | Fed. Rep. of Germany ......... 55/158 |
| 3344917 | 7/1984 | Fed. Rep. of Germany . |
| 31195 | 8/1974 | Japan ........................................ 55/158 |
| 59-206006 | 11/1984 | Japan . |
| 2139110 | 11/1984 | United Kingdom ..................... 55/16 |

OTHER PUBLICATIONS

*Facilitated Transport in Perfluorinated Ionomers*, Prof. P. G. Glugla, Univ. of Colorado, Dept. of Chem. Engineering, Boulder, Colorado.
*American Industrial Hygiene Association Journal*, M. L. Langhorst, "A Hollow Fiber Device for Separating Water Vapor from Organic Vapors", 44(8), 592, (1983).
DuPont sales brochure, "*Nafion*", *Perfluorosulfonic Acid Products*.

*Primary Examiner*—Robert Spitzer
*Attorney, Agent, or Firm*—Norman L. Sims

[57] ABSTRACT

The invention is a method of separating a gas comprising helium, oxygen, nitrogen or carbon dioxide from a mixture of gases containing helium, oxygen, nitrogen or carbon dioxide wherein the method comprises A. contacting the gas mixture with a thin, non-porous membrane comprising a polymer with a perfluorinated backbone and pendant ionomer moieties which contain cations of alkali metals, alkaline earth metals, or transition metals under conditions such that helium, oxygen, nitrogen or carbon dioxide selectively permeates through the membrane to the other side of the membrane; and, B. removing the permeated helium, oxygen, nitrogen or carbon dioxide from the other side of the membrane.

The membranes useful in the method of this invention demonstrate good selectivity for oxygen, helium, nitrogen, and carbon dioxide over other gases in gas mixtures containing such gases. Furthermore, the permeabilities of oxygen, helium, and carbon dioxide through these membranes is quite good.

18 Claims, No Drawings

GAS SEPARATIONS USING MEMBRANES COMPRISING PERFLUORINATED POLYMERS WITH PENDANT IONOMERIC MOIETIES

BACKGROUND OF INVENTION

This invention relates to a novel method of separating helium, oxygen, nitrogen or carbon dioxide from gas mixtures containing such gases using membranes comprising perfluorinated polymers with pendant ionomeric moieties.

In recent years there has been an increasing demand for the separations of gases in gas mixtures. One such separation is the separation of oxygen from nitrogen. In certain embodiments, it is desirable to use enriched oxygen streams, for example, to enhance combustion of certain materials. In other embodiments, it is desirable to have nitrogen with very little oxygen in it, for example, in fruit or food storage and shipping. Another such separation is the separation of helium from natural gas. There is also a demand for separating carbon dioxide from gas streams containing carbon dioxide, including separating carbon dioxide from natural gas. It is also desirable to separate nitrogen from natural gas or light hydrocarbons including methane.

One such method for performing these separations is to contact the gas mixture with a membrane which is selectively permeable for one of the components of the gas mixture. In such embodiment, the selectively permeable gas passes through the membrane at a faster rate than the other gas, and by collecting the selectively permeated species on the opposite side of the membrane, some degree of separation can be achieved.

The need is to find membranes which provide a high permeability for the selectively permeable species, a high ratio of permeation of the selectively permeable species as compared to the non-selectively permeable species, and good mechanical properties.

SUMMARY OF INVENTION

The invention is a method of separating a gas comprising helium, oxygen, nitrogen or carbon dioxide from a mixture of gases containing oxygen, helium, nitrogen or carbon dioxide wherein the method comprises A. contacting the gas mixture with a thin, non-porous membrane comprising a polymer with a perfluorinated backbone and pendant ionomer moieties which contain cations of alkali metals, alkaline earth metals, or transition metals under conditions such that oxygen, nitrogen, helium or carbon dioxide selectively permeates through the membrane to the other side of the membrane; and, B. removing the permeated oxygen, nitrogen, helium or carbon dioxide from the other side of the membrane.

The membranes useful in this invention demonstrate good selectivity for oxygen over nitrogen, helium over light hydrocarbons, carbon dioxide over light hydrocarbons and nitrogen over light hydrocarbons. Furthermore, the permeabilities of oxygen, helium, and carbon dioxide through these membranes is quite good.

DETAILED DESCRIPTION OF INVENTION

Membranes useful in this invention are derived from polymers which have a perfluorinated backbone with pendant ionomeric groups, wherein the ionomers have bonded thereto cations of the alkali metals, alkaline earth metals, or transition metals. Preferably, the pendant groups are —$CO_2$— or —$SO_3$—, to which are bound cations comprising an alkali metal, an alkaline earth metal, or a transition metal. Preferably, the membranes useful in this invention comprise polymers which correspond to the formula

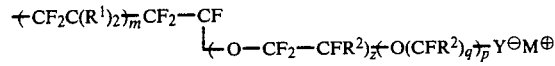

wherein $R^1$ is independently in each occurrence fluorine or a $C_{1-10}$ perfluoroalkyl group;

$R^2$ is independently in each occurrence fluorine, or $C_{1-10}$ perfluoroalkyl group;

Y is independently in each occurrence

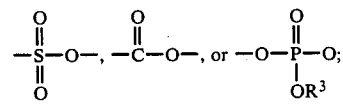

$R^3$ is independently in each occurrence a hydrogen, fluorine, a $C_{1-10}$ alkyl group, a $C_{1-10}$ fluoroalkyl, or a $C_{1-10}$ perfluoroalkyl group;

M is an alkali metal, alkaline earth metal, or transition metal;

z is an integer of from about 0 to about 6;

m is a positive real number of about 5 to about 15;

p is an integer of from about 0 to about 16; and, q is an integer of from about 1 to about 16.

In the hereinbefore presented formulas, $R^1$ is preferably fluorine or a $C_{1-3}$ perfluorocarbon; more preferably, fluorine or a trifluoromethyl group; and most preferably, fluorine. $R^2$ is preferably fluorine or a $C_{1-3}$ perfluorocarbon; more preferably, fluorine or trifluoromethyl; and most preferably fluorine. $R^3$ is preferably hydrogen or a $C_{1-10}$ alkyl, and most preferably hydrogen. M is preferably an alkali metal, copper, or nickel; and most preferably sodium, potassium, or copper. Y is preferably —$SO_3$—, or —$CO_2$—; and most preferably —$SO_3$—. Preferably, z is about 0 to about 2. Preferably, q is between about 1 and about 6. Most preferably, q is about 2 to about 4. Preferably m is between about 5 and 10. Preferably, p is between about 0 and about 6 and most preferably between about 0 and about 2.

The polymers useful in the process of this invention are those which have sufficient mechanical strength to withstand the usage conditions, that is the temperatures, pressures, flow rates, and the like, under which these separations take place. Such polymers preferably have an equivalent weight of between about 500 and 2000, more preferably have an equivalent weight of between about 700 and 1500, most preferably between about 800 and 1200.

The polymers useful in this invention can be prepared by polymerizing a monomer of the formula

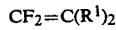

with a monomer of the formula

to prepare a polymer of the formula described hereinbefore, wherein $R^4$ is hydrogen, fluorine, $C_{1-10}$ alkyl, and X is —$SO_3$—, —$CO_2$—, —$SO_2$—, or

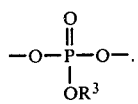

X is preferably —$CO_2$—, or —$SO_2$—. When X is $SO_2$, $R^4$ is preferably hydrogen, fluorine or methane. $R^1$, $R^2$, z, and q are hereinbefore defined. Such polymerization processes are well known in the art and are described in the following U.S. Pat. Nos.: 3,282,875; 3,909,378; 4,025,405; 4,065,366; 4,116,888; 4,123,336; 4,126,588; 4,151,052; 4,176,215; 4,178,218; 4,192,725; 4,209,635; 4,212,713; 4,251,333; 4,270,996; 4,329,435; 4,330,654; 4,337,137; 4,337,211; 4,340,680; 4,357,218; 4,358,412; 4,358,545; 4,417,969; 4,462,877; 4,470,889; and 4,478,695, all incorporated herein by reference See also T. D. Gierke, "PERFLUORINATED IONOMER MEMBRANES", ACS Symposium Series No. 180, pp. 386-388 (1982), incorporated herein by reference.

In one more preferred embodiment, the polymer is prepared by an emulsion polymerization. This polymerization is performed in an aqueous emulsion of one or both of the monomers. The monomers are contacted in the emulsion in the presence of a free radical initiator, a buffer capable of maintaining the emulsion neutral, preferably about 6, and a surfactant capable of supplying micelles wherein polymer-formation may begin, and capable of stabilizing the polymer emulsion in the latex form throughout the reaction. The polymerization is preferably performed in a semi-batch mode. The solid reactants are charged to the reactor; water is added; the reactor is pressurized with inert gas, or with one of the monomers, where such is gaseous. The initiator is charged then, if it had not been charged previously. It is preferable to perform the reaction with agitation. Preferable temperatures are between about 20° and about 110° C., more preferably between about 40° and about 70° C. Preferable pressures are between about 1 (101 KpA) and about 30 atm (3039 KpA). Most preferable pressures are between about 4 (405 KpA) and 20 atm (2026 KpA). The reaction is continued until the desired degree of polymerization has occurred. Preferable times are between about 5 minutes and about 24 hours, more preferably about 5 minutes to about 2 hours.

The polymer may be recovered by acidifying the latex with an acid, such as HCl. The polymer is washed separately with water and an alkanol, preferably methanol, and dried at elevated temperatures, preferably under vacuum. One class of the most preferred monomers for the emulsion polymerization are $CF_2$=$CF_2$, and $CF_2$=$CFOCF_2CF_2SO_2F$. Preferred initiators are $Na_2S_2O_8$ or $(NH_4)_2S_2O_8$ and $NaHSO_3$. The preferred buffers are $NaH_2PO_4$ and $Na_2HPO_4$. The preferred surfactant is $NH_4CO_2(CF_2)_6CF_3$ or an alkali metal salt thereof.

In another more preferred embodiment the monomers for the emulsion polymerization are $CF_2$=$CF_2$ and $CF_2$=$CFOCF_2CF_2CO_2CH_3$. The preferred initiators, buffers and surfactants are as described hereinbefore. In the embodiments wherein Y is —$CO_2$— the use of pressures at the higher end of the described ranges is preferred for forming the polymer.

In the embodiment wherein Y is $SO_2$ and $R^4$ is fluorine, the polymer is converted to the hydrolyzed form by contacting with aqueous alkali metal hydroxide under conditions such that the $SO_2F$ units undergo hydrolysis. The acid form of the polymer is prepared by contacting the hydrolyzed form of the polymer with concentrated (about 6N) hydrochloric acid at elevated temperatures, about 90° C.

In the embodiment wherein X is —$CO_2$— and $R^4$ is $C_{1-10}$ alkyl, the polymer is converted to the acid form by means known to those skilled in the art. This may generally be achieved by hydrolysis of the ester with aqueous acid or with aqueous base and subsequent acidification with aqueous acid. See March *Advanced Organic Chemistry*, pp. 349-353 (1977), McGraw-Hill (New York) incorporated herein by reference.

The desired ionomeric form of the polymer is formed by contacting either the hydrolyzed form of the polymer or acid form of the polymer with a salt of the appropriate cation. The cations of alkaline earth metals, alkali metals, or transition metals are exchanged into the pendant ionomer moieties from the perfluorinated backbones by contacting such polymers with perfluorinated backbones with aqueous solutions of salts of such alkali metals, alkaline earth metals, or transition metals. Such contacting is performed under conditions such that the alkali metal, alkaline earth metal, or transition metal cations exchange with protons on the ionomeric pendant species. Preferably, the cations are exchanged onto the ionomeric moieties by immersion of the acid form of such membranes in an aqueous solution of about 0.5 to about 2.0M metal salt for about 1 to about 48 hours at ambient temperatures, about 20° to 25° C. Thereafter the membrane is rinsed.

The membranes useful in this invention can take any form known to one skilled in the art. In particular, the membrane may be a homogeneous membrane, a composite membrane, or an asymmetric membrane. Homogeneous and composite membranes are prepared by forming a thin, discriminating layer which is dense and free of voids and pores. Such membranes or layers have generally the same structure and composition throughout the membrane.

The polymers useful as membranes in this invention can be fabricated into membranes by any process known to the skilled artisan. The membranes may be flat sheet membranes or spiral wound membranes wherein the sheets are prepared by extrusion, compression molding, blow molding, casting from solutions or dispersions, melt casting, and the like. Alternatively, the polymers may be melt spun into tubular or hollow fiber form membranes. Such processes for the formation of such membranes are well known to those skilled in the art.

Extruded membranes are prepared by extruding the dried polymer at elevated temperatures, preferably 260° to 290° C., through a die and thereafter drawing the film down to the desired thickness. The drawn film is quenched on a cool surface, for example stainless steel. The extruded films can be cleaned with acetone and air dried.

In the embodiment wherein the pendant moiety is $SO_3{}^-M^+$ and the membranes are prepared by extrusion, or blown films techniques, the membranes are prepared from the sulfonyl halide form. Such membranes thereafter are hydrolyzed, and cation exchanged to get the desired species. In another embodiment, the membranes may be solution or dispersion cast. In this embodiment any form of the polymer may be used, including the acid or cation exchanged form. This procedure is described in U.S. Pat. No. 4,433,082 incorporated herein by reference. A preferred method of solution casting the polymers to form membranes is described in commonly assigned patent application Ser. No. 739,931, filed May 31, 1985, incorporated herein by reference. A preferred method of dispersion casting the membranes used in this method is described in commonly assigned U.S. patent application Ser. No. 739,955, filed May 31, 1985, incorporated herein by reference. In the solution casting method up to 0.5 percent by weight of the polymer is dissolved in a solvent corresponding to the formula $$PCF_2CQTP^1$$

wherein P is a fluorine, chlorine, bromine or iodine; $P^1$ is chlorine, bromine or iodine; Q and T are independently in each occurrence hydrogen, fluorine, chlorine, bromine, iodine, or $R^5$; $R^5$ is $C_{1-6}$ perfluoroalkyl, or chlorinated $C_{1-6}$ perfluorine alkyl. Preferably, P and $P^1$ are Br; and Q and T are fluorine. Preferred solvents have a boiling point of less than about 110° C., a density of between about 1.55 and about 2.97 g/cm$^3$, and a solubility parameter of between about 7.1 and about 8.2 Hildebrands. In the dispersion casting method between about 0.1 and about 50 percent by weight of the polymer is dispersed in the above-described solvent. The preferred solvent is FREON 113 ® (trademark of du-Pont).

Thereafter, the polymer solution or dispersion is cast on a surface, and in the case of a homogeneous membrane on a surface from which the finished membrane may readily be separated. A convenient way of carrying out this operation is either by casting the membrane solution onto a support surface which may be dissolved away from the finished film following the drying and curing step or by casting the membrane onto a support having low surface energy, such as silicone, coated glass, or a surface to which the membrane will not adhere, such as mercury. Casting is done by pouring the solution or dispersion onto the appropriate surface and sizing using the appropriate tool, to form a solution or dispersion of the appropriate thickness. Thereafter, the cast solution or dispersion is exposed to drying or curing conditions. Such conditions are used to remove the solvent thereby leaving a thin, discriminating layer of polymer which is homogeneous. The solution can be dried either by exposing to a vacuum, exposing to elevated temperatures, by allowing the solvent to evaporate by time, or any combination thereof. Generally, it is preferable to expose the cast solution to elevated temperatures, preferably less than about 110° C. In one preferred embodiment, such exposure is done in a vacuum oven or under vacuum conditions at elevated temperatures. Preferably, the homogeneous membrane has a thickness of between about 5 microns and about 130 microns, and most preferably between about 1 mil (25.4 microns) and about 2 mils (50.8 microns).

To prepare a composite membrane, a homogeneous thin, discriminating layer can be formed, and thereafter adhered to a porous support after formation. Alternatively, the porous support can be the surface upon which the membrane is cast. In such embodiment, composite membrane is prepared by casting a forming solution or dispersion as a uniform coating on the porous support which forms the support layer for the finished membrane. Penetration of the polymer from which the thin, discriminating layer is formed into pores of the porous supporting layer and the layer itself is acceptable so long as the desired thickness of the semi-permeable membrane is not exceeded. In a composite membrane, the membrane is supported on a porous substrate or structure. This porous supporting layer is characterized in that it does not greatly impede the transport across this layer of all components of a fluid in contact with the porous layer. The porous supporting layer can comprise a discriminating layer which impedes the transportation of some fluid components to the discriminating layer, but generally this second discriminating layer is not necessary or desirable. In one embodiment, the supporting layer can be a metal or polymeric plate with a plurality of holes drilled through it. However, such a drill plate is not advantageous because it can significantly reduce the effective area of the membrane. In a preferred embodiment, the porous supporting layer is a very pourous polymer membrane. Illustrative of such polymeric supporting layers are cellulose ester and microporous polysulfone membranes. Such membranes are commercially available under the trade names, MILLIPORE, PELLICON and DIAFLOW. Where such supporting membranes are thin or highly deformable, a frame may also be necessary to adequately support the semi-permeable membrane. In one especially preferred embodiment, the polymeric supporting layer is a hollow fiber of a microporous polymer such as polysulfone, cellulose acetate, or some other cellulose ester. The hollow fiber itself provides adequate support for the semipermeable membrane layer coated on the inside or outside surface of the fiber. Polysulfone hollow fibers are most preferred for this application. After the solution or dispersion useful in forming the thin, discriminating layer is cast on the porous support, the porous support and solution cast thereon are then exposed to conditions for removal of the solvent so as to form the dense skin. Such conditions are similar to those described hereinbefore for the formation of the homogeneous membrane.

Under certain conditions, it may be highly desirable to provide support to the membrane when the membrane is employed in a separation apparatus or process. In one embodiment, the peripheral area of the membrane is affixed to a framing structure which supports the outer edge of the membrane. The membrane can be affixed to the framing structure by a clamping mechanism, adhesive, chemical bonding, or other techniques known in the prior art. The membrane affixed to the frame can then be sealingly engaged in the conventional manner in a vessel so that the membrane surface inside the framing support separates two otherwise non-communicating compartments in the vessel. The skilled artisan will recognize that the structure which supports the membrane can be an integral part of the vessel or even the outer edge of the membrane.

The membranes of this invention generally are relatively thin. Such membranes preferably have a thickness of between about 0.5 microns and about 130 microns; and more preferably between about 1 mil (25.4 microns) and about 2 mils (50.8 microns). In operation, the membrane is sealingly engaged in the conventional manner in a vessel so that the membrane surface separates two otherwise non-communicating compartments in the vessel. The skilled artisan will recognize that the structure which supports the membrane can be an integral part of the vessel or even the outer edge of the membrane.

As used herein, the term semi-permeable membrane refers to a membrane which displays different permeabilities for different species of molecules and therefore, may be used in the separation of such molecules having different permeabilities across the membranes. These molecules in this invention are present as a gas.

In practice, a gaseous mixture containing oxygen, helium, nitrogen or carbon dioxide is contacted with the membrane, such that such gaseous mixture is on one side of the membrane which separates the non-communicating compartments in the vessel. The species which is preferentially permeated through the membrane is removed from the other compartment in the vessel. In this invention, the preferentially permeating species are helium, oxygen, nitrogen or carbon dioxide. In one preferred embodiment oxygen is separated from air. In another preferred embodiment helium is separated from natural gas or light hydrocarbons, such as methane. In another preferred embodiment carbon dioxide is separated from natural gas or light hydrocarbons, such as methane. In still another embodiment nitrogen is separated from natural gas or light hydrocarbons, such as methane. It is to be noted that the non-preferentially permeating species will permeate through the membrane, the product taken off of the membrane is generally not free of the nonpreferentially permeating species, but is much richer in the preferentially permeating species, for example, oxygen, carbon dioxide, nitrogen or helium.

In many of these separations, the driving force to drive the preferentially permeating species across and through the membrane is a pressure differential between the feed side of the membrane and the product side of the membrane. Feed side of the membrane refers herein to that side of the membrane to which the gaseous mixture from which the desired species is to be separated is contacted. Product side of the membrane is that side of the membrane to which the species permeate and on which the stream richer in the preferentially permeating species can be found. Preferably, in the separation of oxygen from air this pressure differential is between about 90 (620 KpA) and about 250 psi (1720 KpA). In the separation of nitrogen, carbon dioxide or helium from light hydrocarbons or natural gas the pressure differential across the membrane is between about 280 (1930 KpA) and about 900 psi (6200 KpA). In the embodiment wherein oxygen is separated from nitrogen, the separation can take place at temperatures of between about 0° and about 100° C., more preferably between about 0° and 50° C. In that embodiment where helium, nitrogen or carbon dioxide is separated from light hydrocarbons or natural gas, the separation can take place at temperatures between about $-10°$ and about 120° C.

The membranes of this invention, under preferred conditions, give a separation factor of oxygen over nitrogen of 3 or greater, more preferably about 4.5 or greater. Permeabilities used hereinafter are in the units of $cm^3(STP)\cdot cm/cm^2\cdot s\cdot cmHg$. The permeability for oxygen is preferably $0.7\times 10^{-10}$ or greater, and more preferably $3.0\times 10^{-10}$ or greater. Under preferred conditions, the separation factor for carbon dioxide over methane is 20 or greater, and under more preferred conditions, 30 or greater. The permeabilities for carbon dioxide under preferred conditions are $1\times 10^{-10}$ or greater, and under more preferred conditions, $20\times 10^{-10}$ or greater. The separation factors for helium over methane under preferred conditions are preferably 200 or greater, and under more preferred conditions, 350 or greater. The permeabilities of helium under preferred conditions are $15\times 10^{-10}$ or greater, and more preferably, $30\times 10^{-10}$ or greater. Under preferred conditions the separation factor for nitrogen over methane is 1.7 or greater, under more preferable conditions 3.0 or greater. In the separation of nitrogen from methane, the permeabilities of nitrogen under preferred conditions are $0.1\times 10^{-10}$ or greater, and under more preferred conditions $0.20\times 10^{-10}$ or greater.

SPECIFIC EMBODIMENTS

The following examples are included for illustrative purposes only and are not intended to limit the scope of the invention or the claims. Unless otherwise stated, all parts and percentages are by weight.

Example 1—Preparation of Sodium Exchanged Perfluorosulfonic Acid Membrane

A fluoropolymer derived by the copolymerization of tetrafluoroethylene with perfluorosulfonyl vinyl ether monomer, with about an 830 average equivalent weight, is placed in a 25% aqueous sodium hydroxide solution. The fluoropolymer is left in the sodium hydroxide solution for a period of about 16 hours, at a temperature of 90° C. Thereafter, the polymer is melt cast through a dye to produce a film.

Example 2—Preparation of Potassium Exchange Perfluorosulfonic Acid Polymer

A fluoropolymer prepared by copolymerization of tetrafluoroethylene with perfluorosulfonyl vinyl ether monomer, with an average equivalent weight of about 830, is immersed in a dimethyl sulfoxide solution of potassium hydroxide. This immersion took place for a period of 12 hours at a temperature of 90° C. A film is fabricated by melt casting the polymer through a die to form a membrane.

Example 3—Copper Form of Perfluorosulfonic Acid Polymer

A polymer which is the copolymer of tetrafluoroethylene and perfluoro-3,6-dioxa-4-methyl-7-octane sulfonic acid, with an equivalent weight of 1200, commonly known as NAFION 125® (trademark of duPont), in its acid form is equilibrated in a 0.75 molar copper chloride $CuCl_2\cdot 2H_2O$ solution for about 24–48 hours at ambient temperature. A second polymer like that described in Example 1 in the acid form is equilibrated with 0.75 molar $CuCl_2\cdot 2H_2O$ solution for 24–48 hours at ambient temperature.

Example 4—Preparation of Nickel Exhanged Perfluorosulfonic Acid Polymer

A NAFION 125 polymer in the acid form is immersed in a 0.75 molar $Ni(NO_3)_2\cdot 6H_2O$ solution for between 24 and 48 hours at ambient temperature.

EXAMPLE 5

Several metal exchanged perfluorosulfonic acid polymers are tested in single gas permeation tests for the permeation of oxygen, nitrogen, methane, and carbon dioxide. The gas permeations are performed pursuant to methods described in ASTM D-1434-75,513 for a description of method and procedures used for determination of gas transmission rates. The apparatus used is either a variable volume gas transmission cell or a variable pressure permeation apparatus. The results of the gas permeation experiments are compiled in Tables I and II. These experiments were run on both small gas permeability cells and large gas permeability cells. The membrane surface area for the small gas permeability cells is about 7.07 centimeter squared and the transmembrane pressure is about 50 psi. The temperature was 25° C. For large gas permeability cells, the membrane surface area is 67.9 centimeters squared with a transmembrane pressure of about 100 psi and a temperature of 25° C.

TABLE I

| Polymer | Cation Form | Gas Permeability Coefficients[a] | | | | |
|---|---|---|---|---|---|---|
| | | $CO_2$ | $CH_4$ | $O_2$ | $N_2$ | He |
| 1 | $SO_2F$ | 8.99 | 0.603 | 3.50 | 1.08 | 33.9 |
| 1 | $H^+$ | 1.31 | 0.072 | 0.584 | 0.132 | 17.7 |
| 1 | $Li^+$ | 1.20 | 0.057 | 0.552 | 0.127 | 19.1 |
| 1 | $Na^+$ | 1.79 | 0.067 | 0.764 | 0.205 | 22.7 |
| 1 | $K^+$ | 2.17 | 0.085 | 0.810 | 0.261 | 20.7 |
| 1 | $Ca^+$ | 1.97 | 0.116 | 0.774 | 0.221 | 18.9 |
| 2 | $Ni^{+2}$ | 11 | 3.9 | | | |
| 2 | $Cu^{+2}$ | 17 | .5 | | | |

[a]Permeabilities in units of $10^{-10} cm^3(STP) \cdot cm/cm^2 - s \cdot cm\ Hg$.

TABLE II

| Polymer Form | Cation Form | Gas Separation Factors | | | | | |
|---|---|---|---|---|---|---|---|
| | | $CO_2/CH_4$ | $O_2/N_2$ | $N_2/CH_4$ | $CO_2/O_2$ | $CO_2/N_2$ | $He/CH_4$ |
| 1 | $SO_2F$ | 15 | 3.2 | 1.8 | 2.6 | 8.3 | 56 |
| 1 | $H^+$ | 18 | 4.4 | 1.8 | 2.2 | 9.9 | 250 |
| 1 | $Li^+$ | 21 | 4.3 | 2.2 | 2.2 | 9.5 | 335 |
| 1 | $Na^+$ | 27 | 3.7 | 3.1 | 2.3 | 8.7 | 340 |
| 1 | $K^+$ | 26 | 3.1 | 3.1 | 2.7 | 8.3 | 240 |
| 1 | $Ca^+$ | 17 | 3.5 | 1.9 | 2.5 | 8.9 | 160 |
| 2 | $Ni^{+2}$ | 28 | | | | | |
| 2 | $Cu^{+2}$ | 34 | | | | | |

Polymer 1 is a copolymer of tetrafluoroethylene and perfluorosulfonyl vinyl ether monomer in its anhydrolyzed form with an equivalent weight of about 830; Polymer 1 is then hydrolyzed and converted to various cation forms; Polymer 2 is a copolymer of tetrafluoroethylene and perfluoro-3,6-dioxa-4-methyl-7-octine sulfonic acid, with an equivalent weight of about 1200.

What is claimed is:

1. A method of separating a gas comprising helium, oxygen, nitrogen or carbon dioxide from a mixture of gases containing helium, oxygen, nitrogen, light hydrocarbons or carbon dioxide wherein the method comprises A. contacting the gas mixture with a thin, non-porous membrane comprising a polymer with a perfluorinated backbone and pendant ionomer moieties which contain cations of alkali metals, alkaline earth metals, or transition metals under conditions such that helium, oxygen, nitrogen or carbon dioxide selectively permeates through the membrane to the other side of the membrane; and,
   B. removing the permeated helium, oxygen, nitrogen or carbon dioxide from the other side of the membrane.

2. The method of claim 1 wherein a pressure differential is maintained across the membrane between the side of the membrane in contact with the gas mixture and the other side of the membrane wherein the higher pressure is maintained on the side of the membrane in contact with the gas mixture.

3. The method of claim 2 wherein the polymer comprises units corresponding to the formula $$-(CF_2C(R^1)_2)_m\!\!-CF_2-CF-$$
$$\qquad\qquad\qquad |$$
$$\qquad (O-CF_2-CFR^2)_z(O(CFR^2)_q)_p Y^\ominus M^\oplus$$

wherein
R$^1$ is independently in each occurrence fluorine or a C$_{1-10}$ perfluoroalkyl group;
R$^2$ is independently in each occurrence a fluorine or a C$_{1-10}$ perfluoroalkyl group;
Y is independently in each occurrence $$\begin{array}{ccc} O & O & O \\ \| & \| & \| \\ -S-O-, & -C-O-, & \text{or}\ -O-P-O; \\ \| & & | \\ O & & OR^3 \end{array}$$

R$^3$ is independently in each occurrence a hydrogen, fluorine, a C$_{1-10}$ alkyl group, a C$_{1-10}$ fluoroalkyl, or a C$_{1-10}$ perfluoroalkyl group;

M is an alkali metal, alkaline earth metal, or transition metal;
z is an integer of from about 0 to about 6;
m is a positive real number of about 5 to about 15;
p is an integer of from about 0 to about 16; and,
q is an integer of from about 1 to about 16.

4. The method of claim 3 wherein $$\begin{array}{cc} O & O \\ \| & \| \\ -S-O & \text{or}\ -CO- \\ \| & \\ O & \end{array}$$

and
M is alkali metal, copper or nickel.

5. The method of claim 4 wherein $$\begin{array}{c} O \\ \| \\ -S-O, \\ \| \\ O \end{array}$$

and
M is sodium, potassium or copper.

6. The method of claim 5 wherein z is an integer of from about 0 to about 2, and q is an integer of from about 2 to about 4.

7. The method of claim 5 wherein the gas mixture comprises oxygen and nitrogen wherein oxygen selectively permeates across the membrane.

8. The method of claim 7 wherein the separation factor is 3.0 or greater.

9. The method of claim 7 wherein the separation factor is 4.5 or greater.

10. The method of claim 5 wherein the gas mixture comprises carbon dioxide and light hydrocarbons and carbon dioxide selectively permeates across the membrane.

11. The method of claim 10 wherein the separation factor is 20 or greater.

12. The method of claim 10 wherein the separation factor is 30 or greater.

13. The method of claim 5 wherein the gas mixture comprises helium and light hydrocarbons and helium selectively permeates across the membrane.

14. The method of claim 13 wherein the separation factor is 200 or greater.

15. The method of claim 13 wherein the separation factor is 350 or greater.

16. The method of claim 5 wherein the gas mixture comprises nitrogen and light hydrocarbons and nitrogen selectively permeates across the membrane.

17. The method of claim 16 wherein the separation factor is 1.7 or greater.

18. The method of claim 16 wherein the separation factor is 3.0 or greater.

* * * * *

UNITED STATES PATENT AND TRADEMARK OFFICE
CERTIFICATE OF CORRECTION

PATENT NO. : 4,666,468
DATED : May 19, 1987
INVENTOR(S) : Marinda L. Wu

It is certified that error appears in the above-identified patent and that said Letters Patent is hereby corrected as shown below:

Column 6, line 15, "porous" is misspelled;

Column 10, "y is" has been left out before formulas at lines 40-45 and 50-54.

Signed and Sealed this

Sixteenth Day of August, 1988

Attest:

DONALD J. QUIGG

*Attesting Officer*       *Commissioner of Patents and Trademarks*